US011625909B1

(12) United States Patent
Zhou et al.

(10) Patent No.: US 11,625,909 B1
(45) Date of Patent: Apr. 11, 2023

(54) TRACK SEGMENT CLEANING OF TRACKED OBJECTS

(71) Applicant: Motional AD LLC, Boston, MA (US)

(72) Inventors: Lubing Zhou, Singapore (SG); Jiong Yang, Singapore (SG); Yilaun Guo, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/736,735

(22) Filed: May 4, 2022

(51) Int. Cl.
| | |
|---|---|
| *G06V 10/80* | (2022.01) |
| *G06V 20/58* | (2022.01) |
| *G06T 7/246* | (2017.01) |
| *G06V 10/98* | (2022.01) |
| *G06V 10/26* | (2022.01) |
| *G06V 10/774* | (2022.01) |

(52) U.S. Cl.
CPC ............ *G06V 10/806* (2022.01); *G06T 7/248* (2017.01); *G06V 10/26* (2022.01); *G06V 10/774* (2022.01); *G06V 10/993* (2022.01); *G06V 20/58* (2022.01); *G06T 2207/20081* (2013.01); *G06T 2207/30241* (2013.01); *G06T 2207/30252* (2013.01)

(58) Field of Classification Search
USPC .......................................................... 382/103
See application file for complete search history.

(56) References Cited

U.S. PATENT DOCUMENTS

| | | | |
|---|---|---|---|
| 2021/0056713 A1* | 2/2021 | Rangesh | ............... G06K 9/6267 |
| 2021/0197861 A1* | 7/2021 | Galoogahi | ......... G01C 21/3602 |
| 2021/0200238 A1* | 7/2021 | Galoogahi | ........... G05D 1/0246 |

OTHER PUBLICATIONS

Weng et al., AutoSelect: Automatic and Dynamic Detection Selection for 3D Multi-Object, arXiv:2012.05894v1 [cs.CV], Dec. 10, 2020, pp. 1-7. (Year: 2020).*
Rangesh et al., No Blind Spot: Full-Surround Multi-Object Tracking for Autonomous Vehicles using Cameras & LIDARs, arXiv:1802.08755v4 [cs.CV], Feb. 19, 2019, pp. 1-12 (Year: 2019).*
Chen et al., Multiple-object Tracking based Monocular Camera and 3-d Lidar Fusion for Autonomous Vehicles, 2019 IEEE 978-1-7281-6321-5/19, pp. 456-460. (Year: 2019).*

\* cited by examiner

*Primary Examiner* — Ishrat I Sherali
(74) *Attorney, Agent, or Firm* — Mintz, Levin, Cohn, Ferris, Glovsky and Popeo, P.C.

(57) ABSTRACT

Provided are methods for track segment cleaning of tracked objects using neural networks, which can include detecting a first track segment and a second track segment. The method includes applying a machine learning model trained to determine if the first track segment and second track segment capture real objects and if the first track segment and the second track segment are representative of an identical object exterior to a vehicle. The method further includes combining the first track segment and the second track segment to form a single track segment having a single trajectory in response to the first track segment and the second track segment being determined to be representative of the identical object. Systems and computer program products are also provided.

27 Claims, 13 Drawing Sheets

Track Segment Cleaning Dataflow 600

Training Dataflow 900

TRACK SEGMENT CLEANING OF TRACKED OBJECTS

BACKGROUND

An autonomous vehicle is a vehicle that is capable of sensing its environment and navigating without human input. Autonomous vehicles rely on multiple types of sensors to perceive the surrounding environment. The sensors provide the autonomous vehicle with data representative of the surrounding environment. The autonomous vehicle performs various processing techniques on the data to recognize objects surrounding the vehicle. Recognizing objects surrounding the vehicle gives autonomous vehicles the information necessary to safely navigate a driving scenario.

Modern perception detection and tracking systems require a huge amount of data with tracked objects to train the neural network models for online deployment. Auto labeling system or offline perception is developed to automatically annotate the tracked boxes from raw data. The annotation quality is critical to the success of model training for online deployment. Segmented and false positive tracks happen commonly in online and offline object detection and tracking systems. Segmented tracks from the same road users and false positive tracks will cause the autonomous vehicle to make wrong decisions for navigating the vehicle safely.

DETAILED DESCRIPTION

Figure 1:
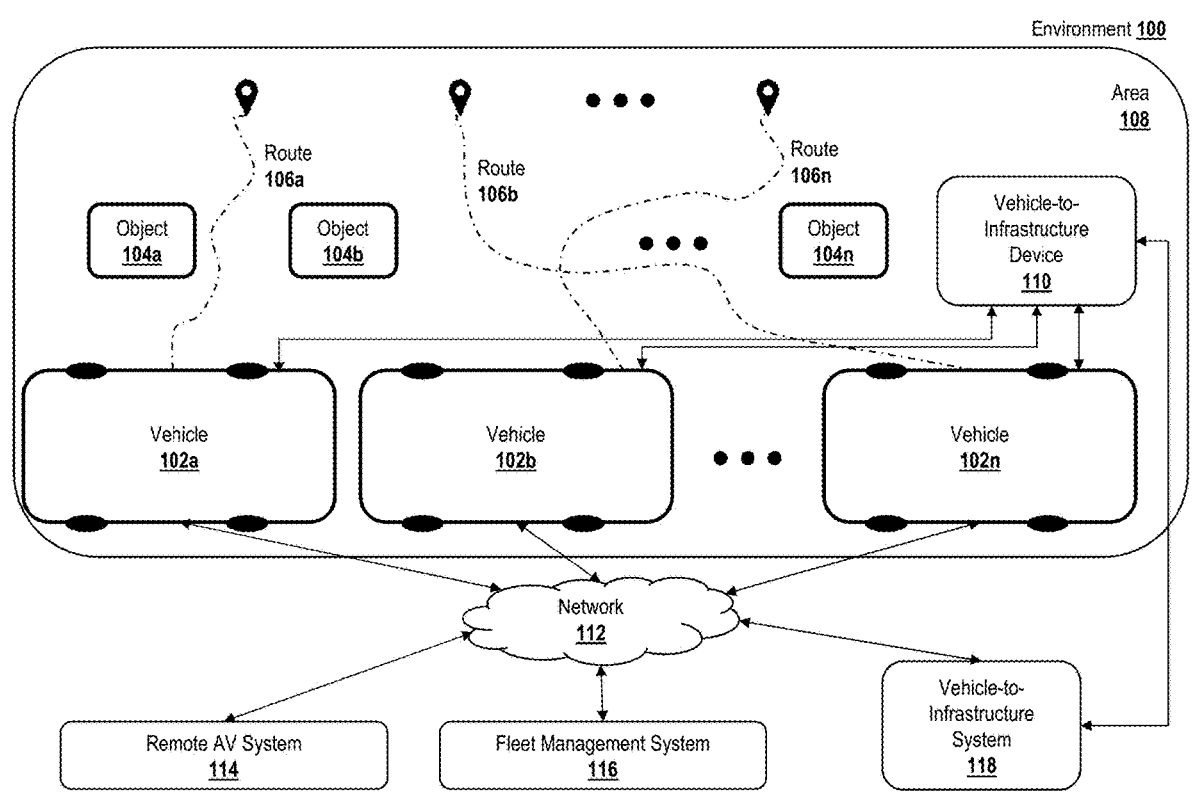
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement track segment cleaning of data representations of tracked objects. A track segment cleaning system can identify and remove potentially erroneous track segments using a machine learning system. Track segments are data associated with perceived objects encountered by a vehicle (such as an autonomous vehicle). Track segment cleaning is a technique in which the erroneous track segments are eliminated or combined with other track segments to capture a complete tracking for a tracked object. Examples of erroneous track segments include redundant, disconnected, or false track segments resulting from poor perception of an object exterior to the vehicle or the failure to identify object movements as belonging to the same object. To eliminate the erroneous track segments, the track segment cleaning system may eliminate or combine the track segments. This elimination or combination reduces computing resources necessary to monitor objects exterior to the vehicle and ensures the planning system of the vehicle makes safe planned movements in response to various driving scenarios.

As an example technique, a track segment cleaning system detects two track segments as potential candidates to combine into a single track segment. After detecting the track segment candidates, the track segment cleaning system applies a machine learning model trained to determine whether the first track segment and the second track segment are representative of an identical object surrounding the autonomous vehicle. The track segment cleaning system may combine the first track segment and the second track segment to form a single track segment. For example, the track segment cleaning system determines the first track segment and the second track segment are to be combined based on determining that the first track segment is associated with a bicycle over a first period of time and a second track segment is associated with the same bicycle over a second period of time. The track segment cleaning system combines the respective trajectories and/or cloud-point features of the first track segment and the second track segment. The combined track segment then has a single set of trajectories and a single set of cloud-point features. Track segment cleaning increases the likelihood of accurate movement planning by the planning system of the vehicle due to removing erroneous track segments. As such, the planning system has an accurate representation of the objects surrounding the vehicle. Further, the track segment cleaning system eliminates or combines erroneous track segments, thereby reducing the computing resources necessary to run the planning system and ensuring the planning system makes safe planned movements in response to various driving scenarios.

By virtue of the implementation of systems, methods, and computer program products described herein, techniques for track segment cleaning of tracked objects. Unlike other object tracking modules in machine learning models, the track segment cleaning framework herein includes techniques for eliminating and combining erroneous track segments into a single track. Instead of potentially tracking false objects or allowing multiple track segments to represent the same object, the track segment cleaning framework eliminates redundant, disconnected, and false track segments. Eliminating these erroneous track segments reduces the computing resources needed for movement planning and increases the safety of planned movements in response to various driving scenarios. More specifically, the track segment cleaning framework can compare the trajectory features, the cloud-point features, and/or the image features of the track segments to determine which track segments are to be stitched together or otherwise eliminated. These technical improvements lead to enhanced decision making by the planning system.

Further, the track segment cleaning system solves technical problems associated with planning modules configured to make planned movements. Technical problems for planning modules include obtaining metrics for evaluating track quality to ensure the vehicle is responding to existing and new object types. For example, the planning system can make poorly planned movements when the planning module is unable to identify erroneous track segments. Without identifying evaluation metrics (e.g., track segment quality score, stitching score) for the track segments, the planning module cannot discern between false and accurate track segments, especially as the vehicle encounters new objects. As a result, the erroneous track segments can negatively affect the planning module's ability to safely navigate the autonomous vehicle.

As such, there is a need for a track segment cleaning system configured to evaluate tracked object segments to eliminate or combine erroneous track segments.

Training samples are required for training the machine learning model. Training samples are generated by adding track quality labels to the track segments generated by the perception detection and tracking system. The labels added to the track segments can be a value representative of a quality of the track sample in comparison to a ground truth track. For example, a value of '1' means the training sample corresponds to a ground truth track and a value of '0' means the training sample corresponds to a false track. But without a sufficient number of labeled training samples, the machine learning model cannot accurately determine the quality score of the track segments representative of the objects encountered by the vehicle. As such, a training sample generator is implemented to correct the shortage of labeled training samples.

The training sample generator produces labeled training samples for training the machine learning model. The training sample generator is configured to associate a label with a track segment to generate a training sample. The training sample generator utilizes ground truth tracks including known good representations of objects observed by the vehicle. The training sample generator compares the ground truth tracks to one or more track segments to produce training samples with an assigned label.

Additionally, the training sample generator utilizes data augmentation techniques to generate labeled training samples. For example, a training sample generator divides a single track into two or more track segments to create training samples. The training samples are associated with a label identifying the two or more track segments as belonging to a single track. For example, a label for the training samples including the two or more track segments has a ground truth stitching score of '1' to indicate that the two or more track segments are from the same track. Alternatively, the training samples are associated with a label identifying the two or more track segments as belonging to separate tracks. For example, a label for the training samples including the two or more track segments belonging to separate tracks have a ground truth stitching score of '0' to indicate that the two or more track segments are from different tracks. These technical improvements provide accurate training tools for the machine learning model. The trained machine learning model can evaluate the quality of track segments and evaluate segments to be stitched together based on the training from the training samples.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
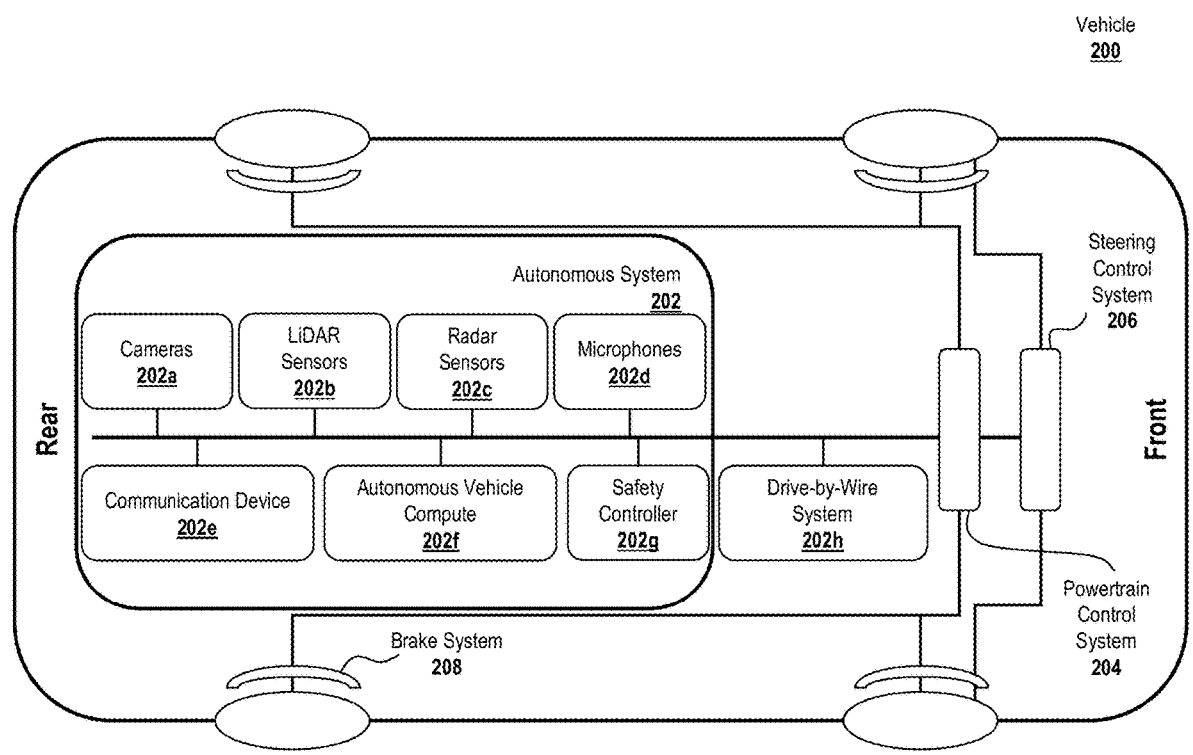
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
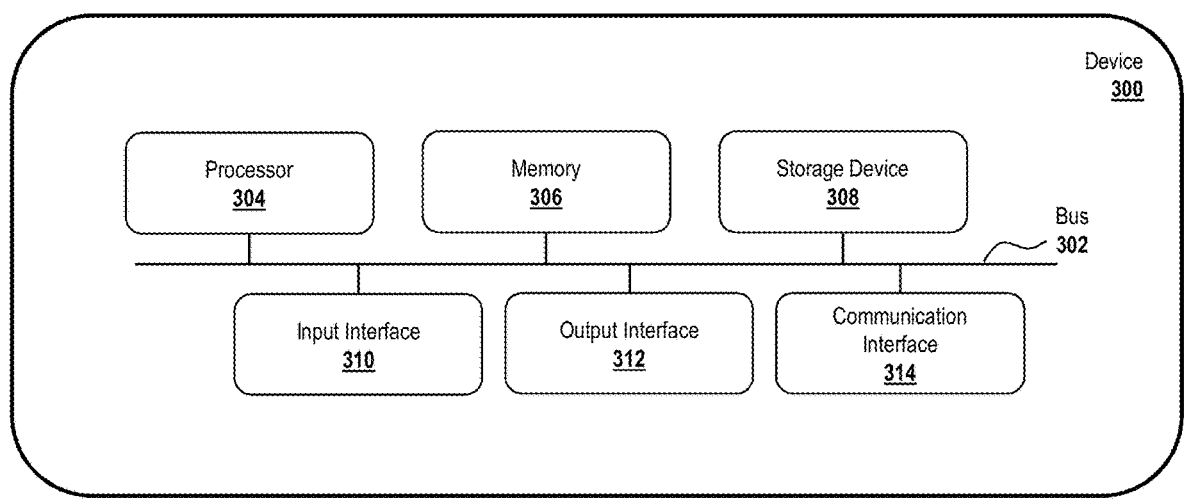
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
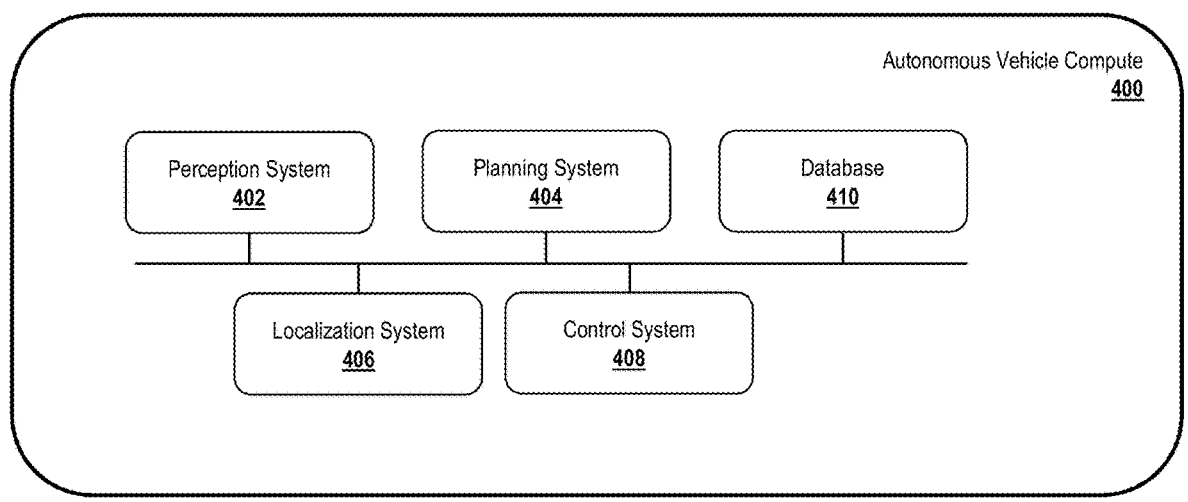
FIG. 4A is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
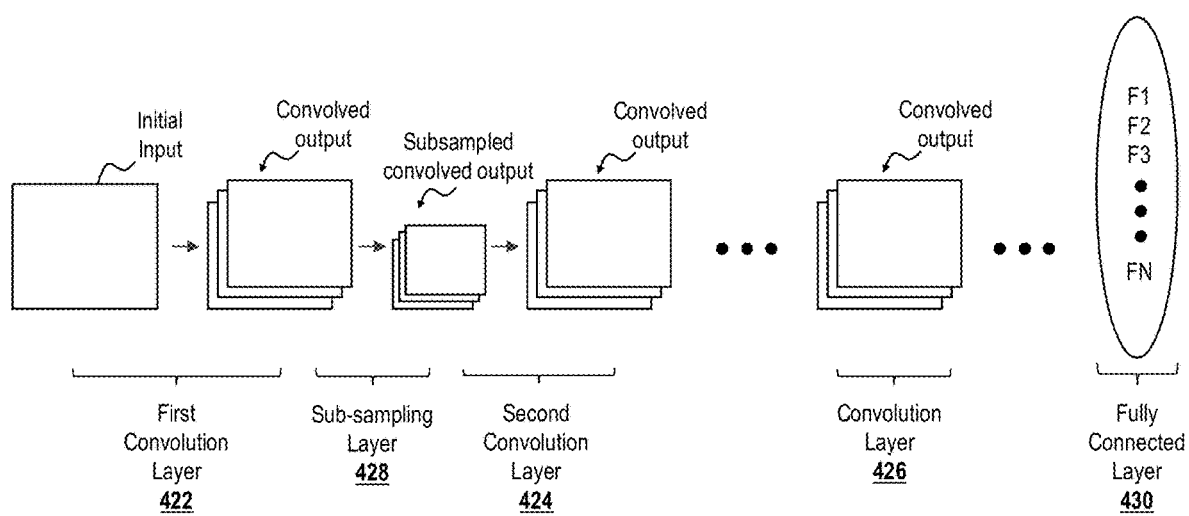
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 420 normalizing sensor data (e.g., image data, LiDAR data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 5:
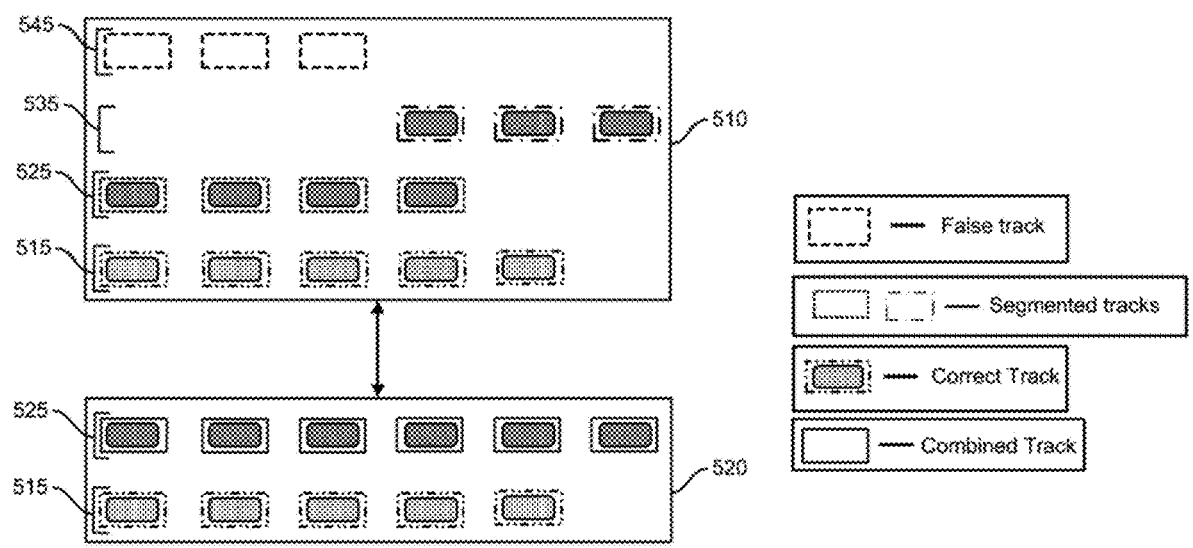
FIG. 5 is a diagram of an implementation of track segment cleaning.

Referring now to FIG. 5, illustrated is a diagram of an implementation of track segment cleaning. Track segment cleaning identifies and eliminates potentially erroneous track segments using a machine learning model. A perception system can generate track segments as representations of objects encountered by the vehicle. But sometimes these track segments are inaccurate or erroneous. Examples of erroneous track segments include redundant, disconnected, or false track segments. Track segment cleaning is a technique in which the redundant, disconnected, or false track segments are eliminated or combined with other track segments to capture a single complete and accurate tracking for a tracked object. Erroneous track segments can be the result of poor perception of an object exterior to the vehicle, poor stitching of object information across timeframes, or perception system 402 and/or planning system 404 failing to identify object movements as belonging to the same object. To correct this problem, track segment cleaning includes identifying false tracks (e.g., tracks having a below-threshold quality). Furthermore, track segment cleaning includes identifying two or more separate track segments that can be combined into a track segment.

Pre-cleaned track segments 510 show multiple track segments that are potentially erroneous. The pre-cleaned track segments 510 can be created by an auto-labeling annotator, which can be implemented by perception system 402 in response to detecting an object. The auto-labeling annotator is configured to associate a track segment with an object as the object is perceived by a sensor at the vehicle. As shown in FIG. 5, pre-cleaning track segments 510 includes four track segments: a first track segment 515, a second track segment 525, a third track segment 535, and a fourth track segment 545.

First track segment 515 includes a first object within its frames, indicating that first track segment 515 is tracking the same object. The first object is included in each frame of first track segment 515 and the first object is not included in any other track segments. The consistency of the first object occupying only one track is indicative that a single object is correctly paired to a single track and that no further cleaning of tracks is needed to obtain a complete track segment for the first object.

Second track segment 525 and third track segment 535 depict two track segments representative of movement for the second object. The second object in second track segment 525 and the second object in third track segment 535 are the same object. But associating two separate track segments for the same object is inefficient and erroneous. Multiple track segments tracking the same object can consume excessive computer resources of planning system 404 and potentially cause navigation decision difficulties for planning system 404, localization system 406, and/or control system 408. As a result, the second object in both second track segment 525 and third track segment 535 presents various inefficiencies and safety concerns. Second track segment 525 and Third track segment 535 should be combined so that the second object is represented by only one track.

Fourth track segment 545 is a false track. No object corresponds to fourth track segment 545. That is, the false track represents no object that exists in real life. As a result, fourth track segment 545 complicates navigation decisions for planning system 404, localization system 406, and/or control system 408. Fourth track segment 545 should be eliminated so that the false track segment does not consume excessive computer resources. For offline perception autolabeling systems, false tracks may reduce output object annotation quality, which can reduce the machine learning based online object detection and tracking models that are trained with these auto-labeled data.

Cleaned track segments 520 show pre-cleaned track segments 510 following the track cleaning process. Cleaned track segments 520 illustrates objects that are represented by only one track segment. Cleaned track segments 520 have a 1:1 correspondence between the number of objects tracked and the number of track segments. Cleaned track segments 520 do not include any false track segments or segments that do not correspond to an object in real life. As shown in FIG. 5, first track segment 515 includes a first object within its frames, which indicates that first track segment 515 is associated with the same object. The first object is included in each frame of first track segment 515 and the first object is not included in any other track segments. The consistency of the first object occupying only one track is indicative that the single object is correctly paired to a single track and that no further consolidation of tracks is needed to obtain a complete track segment for the first object.

Similarly, second track segment 525 includes a second object within its frames, indicating that second track segment 525 is tracking the same object. The second object is included in each frame of second track segment 525 and the second object is not included in any other track segments. The consistency of the second object occupying only one track indicates that the single object is correctly paired to a single track and that no further consolidation of tracks is needed to obtain a complete track segment for the second object. The track segment cleaning process combined third track segment 535 with second track segment 525 to obtain a complete track. Additionally, the track segment cleaning process removed fourth track segment 545 as no real life object corresponds to fourth track segment 545. Cleaned track segments 520 increase the accuracy of the planned movements of planning system 404, reduce processing and memory resources necessary to monitor objects exterior to the vehicle, and increase the likelihood of safe planned movements in response to various driving scenarios.

Figure 6:
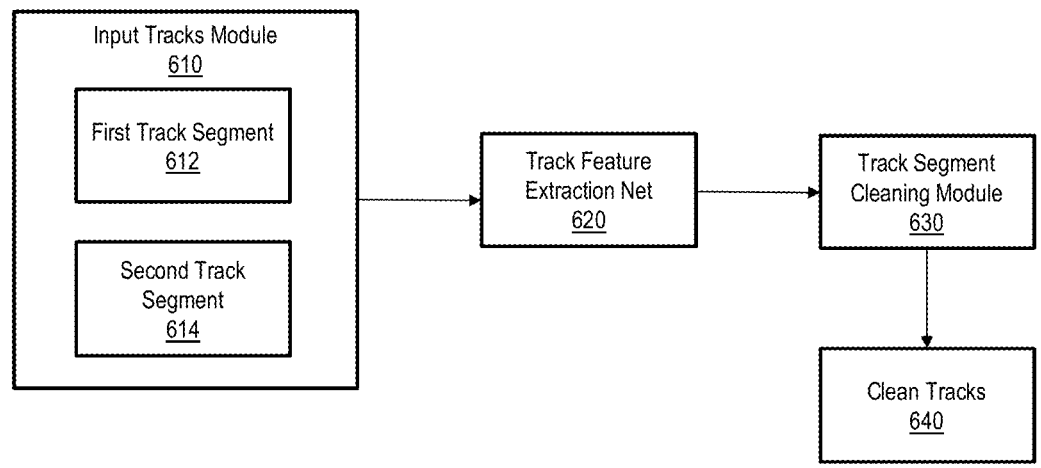
FIG. 6 is a diagram of an implementation of a track segment cleaning dataflow.

Referring now to FIG. 6, illustrated is a diagram of an implementation of a track segment cleaning dataflow 600. Track segment cleaning dataflow 600 identifies potentially redundant, disconnected, or false track segments. The track segments are representative of perceived objects encountered by the vehicle. Track segment cleaning dataflow 600 is configured to eliminate or combine the potentially redundant, disconnected, or false track segments. Additionally, as described herein, Track segment cleaning dataflow 600 applies a machine learning model trained to determine whether track segments are representative of real objects exterior to a vehicle. The trained machine learning model determines the quality of track segments and determines whether the segments are to be stitched together.

An input tracks module 610 is configured to receive track segments. The track segments are representative of objects perceived exterior of the vehicle. A track feature extraction net 620 receives the input tracks selected by the input tracks module 610. The input tracks include a first track segment 612 and a second track segment 614. Track feature extraction net 620 extracts features from first track segment 612 and second track segment 614. The track segment cleaning module 630 determines whether the track segments are representative of the same object by comparing the features from first track segment 612 and second track segment 614. Track segment cleaning module 630 applies a trained machine learning model to determine whether first track segment 612 and second track segment 614 represent the same object. A track segment cleaning module 630 determines whether to combine first track segment 612 and second track segment 614 and output clean tracks 640. Additionally, and/or alternatively, track segment cleaning module 630 can determine that a track segment is to be eliminated based on a track quality segment score.

In an embodiment, track segment cleaning dataflow 600 receives track segments as input tracks at input tracks module 610. The input tracks include track segments representative of objects tracked by perception system 402 and/or planning system 404. For example, a bicycle exterior to the vehicle is an object tracked in perception system 402. The track segments are representative of tracked objects exterior to the vehicle that are spatially monitored relative to a position of the vehicle over a period of time. The tracked objects can be detected through the autonomous system 202, which can include at least one of cameras 202a, LiDAR sensors, 202b, radar sensors 202c, and microphones 202d. For example, the bicycle exterior to the vehicle is initially detected by cameras 202a and subsequently monitored using LiDAR sensors 202b.

In an embodiment, an auto-labeling system automatically annotates the data collected from the vehicle sensors. The auto-labeling annotator can be implemented as an offline version of perception system 402. The auto-labeling annotator is configured to annotate tracked objects representative of real objects and form a track segment. For example, the auto-labeling annotator annotates first track segment 612 representative of a first object. In an embodiment, a first auto-labeling annotation is attached to first track segment 612 and a second auto-labeling annotation is attached to second track segment 614. The annotated track segments can be the input tracks received at input tracks module 610 to begin track segment cleaning dataflow 600.

Input tracks module 610 is configured to select two or more track segments (e.g., first track segment 612 and second track segment 614) from a plurality of track segments that can be potentially combined. Input tracks module 610 can examine traits or characteristics of the plurality of track segments to determine whether two or more track segments can possibly represent the same object. For example, perception system 402 detects a bicycle over a first time period represented by first track segment 612 and perception system 402 detects a bicycle over a second time period represented by second track segment 614. Input tracks module 610 determines that the two tracks can be potentially combined based on a temporal proximity of the two track segments. In another embodiment, first track segment 612 has a first set of timestamps and second track segment 614 has a second set of timestamps where at least one timestamp of the second set of timestamps is different from the timestamp in the first set of timestamps. Input tracks module 610 determines that the two tracks can be potentially combined based on the closest timestamps not exceeding a certain period (for example 3 seconds), and tracked object types being the same between first track segment 612 and second track segment 614.

Additionally, input tracks module 610 determines whether the two tracks can be potentially combined based on a physical proximity of the object in first track segment 612 and the object in second track segment 614. The object in first track segment 612 and the object in second track segment 614 can satisfy a distance threshold. For example, if the distance threshold of five meters is satisfied, then input tracks module 610 determines that first track segment 612 and second track segment 614 possibly represent the same object. In an embodiment, first track segment 612 and second track segment 614 are selected from a plurality of track segments based on satisfying a timestamp threshold, a physical proximity threshold, and/or the like.

After input tracks module 610 determines the track segments that could be potentially combined (i.e., track segment candidates), track segment cleaning dataflow 600 extracts features from the track segment candidates in track feature extraction net 620. Features extracted in track feature extraction net 620 can include trajectory features, cloud point features, and image features. For example, track feature extraction net 620 extracts a first trajectory feature and a first cloud point feature from first track segment 612 representing the bicycle over a first period of time. Additionally, track feature extraction net 620 extracts a second trajectory feature and a second cloud point feature from second track segment 614 representing the bicycle over a second period of time.

Following the extraction process, track segment cleaning dataflow 600 sends the extracted features to track segment cleaning module 630. The track segment cleaning module 630 determines whether first track segment 612 and second track segment 614 are to be combined to a single track based on the extracted features. For example, track segment cleaning module 630 compares the first trajectory feature and the second trajectory feature and, similarly, compares the first cloud point feature and the second point feature corresponding to the bicycle over the two time periods.

Track segment cleaning module 630 can apply a machine learning model trained to determine whether first track segment 612 and the second track segment 614 are representative of an identical object exterior to the vehicle based on the extracted features. The machine learning model can provide analyses for generating scores representative of the likelihood that first track segment 612 and second track segment 614 are representative of the same object exterior to the vehicle. For example, track segment cleaning module 630 assigns a track quality score of 0.9 to first track segment 612 and track segment cleaning module 630 assigns a track quality score of 0.87 to second track segment 614. Track segment cleaning module 630 assigns first track segment 612 and second track segment 614 a stitching score of 0.93.

After generating the scores, track segment cleaning module 630 determines whether the scores satisfy a threshold. For example, if the track quality score threshold is 0.75 and the stitching score threshold is 0.8, then the score thresholds generated by the machine learning model are satisfied. If the scores satisfy the threshold, then track segment cleaning module 630 is configured to combine first track segment 612 and second track segment 614 into a single track segment having a single trajectory and a single cloud point feature. For example, the two track segments representing the bicycle (e.g., first track segment 612 and second track segment 614) and all of the extracted features are combined into a single track segment. The combined track segment then has a single set of trajectories and a single set of cloud-point features.

Track segment cleaning dataflow 600 increases the likelihood of accurate perception of objects and their trajectories, thereby preventing erroneous planned movements by planning system 404. Further, track segment cleaning dataflow 600 identifies redundant, disconnected, or false track segments to eliminate or combine the track segments, thereby reducing computing resources necessary to run planning system 404 and ensuring safe planned movements in response to various types of objects.

Figure 7:
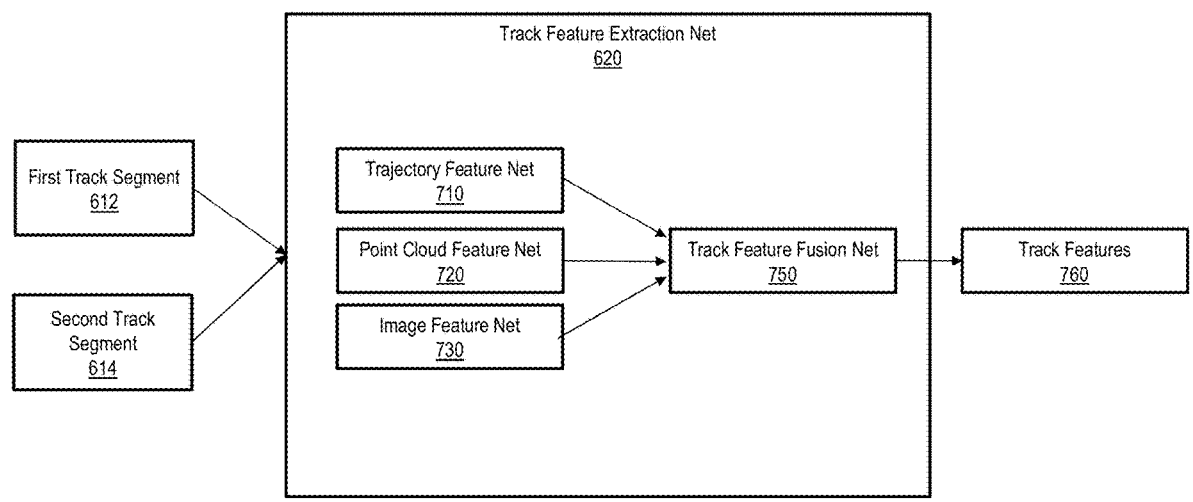
FIG. 7 is a diagram of an implementation of a track feature extraction net.

Referring now to FIG. 7, illustrated is a diagram of an implementation of a track feature extraction net 620. Track feature extraction net 620 is configured to determine features from the track segments. The features determined or extracted from the track segments indicate the quality of the track. Additionally, the features indicate the likelihood that track segments can be combined with other track segments. The features extracted from one track segment are capable of being fused, concatenated, or averaged with features from a different track segment in a track feature fusion net 750. Features that are extracted can include trajectory features, cloud point features, and image features.

Track feature extraction net 620 extracts trajectory features using a trajectory feature net 710. Trajectory features include track boxes from a track segment that can be concatenated to learn the motion characteristics of an object. For example, a track box can be extracted from second track segment 614 that determines the motion of the bicycle is 10 km/hour in a direction perpendicular to the vehicle. Perception system 402 can indicate that planning system 404 is to add a rectangle to an image of the bicycle to indicate the trajectory features of the object.

A track box includes a rectangle having a center, a size, and a heading angle. The rectangle has a center with (x,y) coordinates to determine the middle point of the object. The size of the rectangle has a width and a height that determines the overall size of the object. The heading angle determines the direction of travel. The metadata associated with the rectangle determines the type of object within the rectangle. For example, a track box monitoring a bicycle has a center at the bicycle seat, a size encompassing the bicycle from wheel to wheel, a heading angle of a direction perpendicular to the vehicle, and a metadata identifying the object as a bicycle. The track box can include a timestamp. Multiple track boxes can be strung together, each track box having its own timestamp. With all the track boxes, a machine learning model (as an example, a Multilayer Perceptron network), can be applied to learn robust trajectory features that better represent the track segment trajectory and motion.

Track feature extraction net 620 extracts cloud point features using a point cloud feature net 720. The cloud point features include track points along the track segment that represent a 3D characteristic and motion of the object. The track points include (x,y,z) coordinates, an intensity, and a timestamp. For example, a cloud point feature can be extracted from second track segment 614 that determines the structure of the bicycle. Determining the structure of the bicycle includes determining how the bicycle is to be represented in a 3D plane. Track points along the tires, the frame, the rider, and the handlebars of the bicycle are extracted to represent the bicycle in a rendering of the bicycle in a 3D plane. Multiple cloud point features can be strung together, each cloud point feature having its own timestamp. With all the track points, a machine learning model (as an example, a PointNet network) can be applied to learn robust point features that better represent the object structure and track motion.

Track feature extraction net 620 can extract image features using an image feature net 730. The image features include extracting a corresponding image. Extracting a corresponding image includes extracting segmentation, embedded features, or pixels related to the object. For example, an image of the bicycle is captured to represent the bicycle. The object image region or pixels can be obtained by projecting the 3D track points of the cloud points to the image plane. The pixels can be represented with RGB values and the timestamps can be associated with the image. Multiple images are strung together, each image having its own timestamp. A machine learning model (as an example, a Convolutional Neural Network), is used to learn image features that better represent the appearance features of the tracked object.

With all the trajectory features learned from the trajectory feature net 710, point features learned from the point cloud feature net 720, and the image features learned from the image feature net 730, track feature fusion net 750 uses a machine learning model (as an example, a Multilayer Perceptron network), to combine these multimodal features into a single feature vector that better depicts the track segment. The trajectory feature net 710, point cloud feature net 720, image feature net 730 and track feature fusion net 750 can be learned together. The fused feature learned by the track feature fusion net 750 can make use of all trajectory, point cloud, and image features, and complement each modality better. For example, one white vehicle track segment and one black track segment can be differentiated easily from image features. For another example, a large bus in far distance and a minibus middle-range distance may look similar from image appearance, but it could be easily differentiated from the point features. Trajectory features can differentiate static and dynamic segments easily even when the object appearance and size are similar. In practice, the feature fusion net is flexible to drop one feature modality. For example, it could be trained with only trajectory features and point cloud features when the data contains only the point clouds. Also, the track feature fusion net could also be extended to include other track features like radar features. After the track feature fusion net 750, a track segment can be represented by the track features 760.

Track features 760 is the output of track feature fusion net 750. Track features 760 includes the extracted features from the track segments. For example, track features 760 includes fusion features learned from track trajectory features and point features for the bicycle over the two time periods corresponding to first track segment 612 and second track segment 614.

Figure 8:
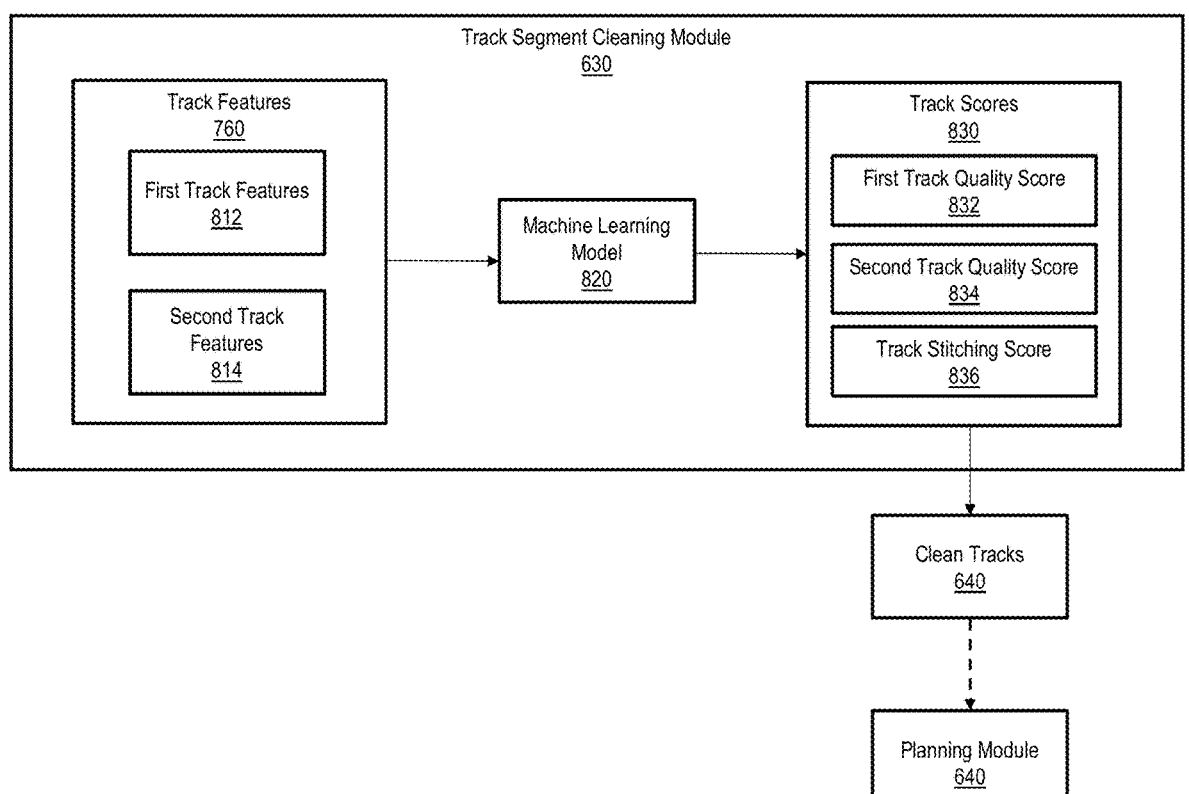
FIG. 8 is a diagram of an implementation of a track segment cleaning module.

Referring now to FIG. 8, illustrated is a diagram of an implementation of a track segment cleaning module 630. Track segment cleaning module 630 includes track features 760, a machine learning model 820, and track scores 830. Track scores 830 includes a first track quality score 832, a second track quality score 834, and a track stitching score 836.

Track features 760 are received from track feature extraction net 620. Track features 760 include a first track features 812 and a second track features 814. First track features 812 correspond to the features extracted from first track segment 612 and second track features 814 correspond to the features extracted from second track segment 614. First track features 812 and second track features 814 are evaluated to determine the quality of the track segment. The quality of the track segment can be indicative of the likelihood that the track segment represents an object in real life. First track features 812 and second track features 814 are compared to determine the stitching score of the at least two track segments. The stitching score of the two tracks is indicative of the likelihood that the resulting stitched track segment is representative of the same object in real life.

Track segment cleaning module 630 applies the machine learning model 820 to determine the quality score and the stitching scores for first track features 812 and second track features 814. More specifically, track segment cleaning module 630 applies machine learning model 820 to determine first track quality score 832 associated with first track segment 612 and second track quality score 834 associated with second track segment 614. In an embodiment, machine learning model 820 has a network architecture with one common convolutional network to consume first track features 812 and second track features 814. The network architecture is configured to output the analyses for the track quality scores for each track and the track stitching score. In another embodiment, the machine learning model 820 has a network architecture including a two-branch convolutional network. One branch regresses the quality score for each track and another branch regresses the stitching score. In another embodiment, machine learning model 820 includes one or more of a multilayer perceptron (MLP), convolutional neural network (CNN), recurrent neural network (RNN), autoencoder, transformer, and/or the like.

Machine learning model 820 is trained to determine whether first track segment 612 and second track segment 614 are representative of the same object based on first track features 812 and second track features 814. For example, machine learning model 820 determines that first track segment 612 and second track segment 614 are representative of the same object based on the track points and intensities of the cloud point features from first track features 812 and second track features 814. In another example, machine learning model 820 determines that first track segment 612 and second track segment 614 have a low likelihood of being the same object based on the center positions and the timestamps of the trajectory features from first track features 812 and second track features 814.

The track segment cleaning module transforms comparative and qualitative analysis from machine learning model 820 into track scores 830. Track scores 830 include three scores: first track quality score 832, second track quality score 834, and track stitching score 836. First track quality score 832 and second track quality score 834 are indicative of the likelihood that the track segment represents an object in real life. Track stitching score 836 of the two tracks is indicative of the likelihood that the resulting stitched track segment of the two tracks is representative of the same object in real life. Machine learning model 820 and track segment cleaning module 630 can generate first track quality score 832, second track quality score 834, and track stitching score 836 to determine the likelihood that first track segment 612 and second track segment 614 are representative of the same object exterior to the vehicle. For example, machine learning model 820 and track segment cleaning module 630 determines 0.9 is first track quality score 832 and 0.87 is second track quality score 834. Machine learning model 820 and track segment cleaning module 630 determine first track features 812 and second track features 814 together have a stitching score of 0.93. In an embodiment, the scores can be generated in a range between 0 and 1.

A low track quality score is indicative of a high likelihood that a track segment is a false positive of an object in real life. For example, first track features 812 include several erratic cloud point features that dramatically vary the structure of the object between at least two timestamps. On the other hand, a high quality track segment is indicative of a high likelihood that a track segment is representative of an object in real life. For example, first track features 812 include consistent cloud point features that maintain the structure of the object over multiple timestamps. In an embodiment, the quality of the track segment is indicative of whether the track segment is to be combined with another track segment. The quality of the track segment is evaluated independent of other track segments. For example, the quality of first track features 812 are evaluated independently of second track features 814.

A low stitching score is indicative that the at least two track segments have a low likelihood of representing the same object. For example, the difference in sizes and heading angles of the trajectory features of first track features 812 and second track features 814 are indicative of the low likelihood that the resulting stitched track segment is representative of the same object in real life. A high stitching score is indicative that the at least two track segments have a high likelihood of representing the same object. For example, the similarity in sizes and heading angles of the trajectory features of first track features 812 and second track features 814 are indicative of the high likelihood that the resulting stitched track segment is representative of the same object in real life.

Track segment cleaning module 630 can determine that some track segments are to be eliminated due to low track segment quality scores. In an embodiment, track segment cleaning module 630 applies machine learning model 820 to determine a third track segment quality score associated with a third track segment. Machine learning model 820 can generate the third track segment quality score to determine the likelihood the third track segment is representative of a real-life object exterior to the vehicle. For example, Machine learning model 820 and the track segment cleaning module 630 determine 0.3 is the third track quality score. With the track quality score threshold as 0.75, the third track quality score fails to satisfy the track quality score threshold. As a result, the track segment cleaning module 630 eliminates the third track segment.

The track segment cleaning module 630 determines whether first track quality score 832, second track quality score 834, and track stitching score 836 satisfy a threshold. For example, if the track quality score threshold is 0.75 and the stitching score threshold is 0.8, then the scores would be satisfied. If the scores satisfy the thresholds, then track segment cleaning module 630 is configured to combine first track segment 612 and second track segment 614 into a single track segment having a single trajectory and a single cloud point feature. For example, the two track segments representing the bicycle (e.g., first track segment 612 and second track segment 614) and all of the extracted features are combined into a single track segment. The combined track segment then has a single set of trajectories and a single set of cloud-point features. In an embodiment, the combined single track segment has a single trajectory and a single cloud-point feature.

In an embodiment, first track segment 612 and second track segment 614 are combined by at least concatenating a trajectory feature of first track segment 612 with a trajectory feature of second track segment 614. In an embodiment, first track segment 612 and second track segment 614 are combined by at least concatenating a cloud point feature of first track segment 612 with a cloud point feature of second track segment 614.

In an embodiment, track segment cleaning module 630 identifies false track segments or low quality track segments for elimination. Track segment cleaning module 630 determines whether a track segment is to be eliminated based on the extracted features. For example, track segment cleaning module 630 evaluates the trajectory feature and, similarly, evaluates the cloud point feature corresponding to the bicycle over the first time period.

In an embodiment, track segment cleaning module 630 can apply machine learning model 820 trained to determine whether the track segment is representative of an object exterior to the vehicle based on the extracted features. Machine learning model 820 can provide analyses for generating scores representative of the likelihood the false track segment is representative of the same object exterior to the vehicle. For example, track segment cleaning module 630 assigns a track quality score of 0.25 to the track segment.

In an embodiment, track segment cleaning module 630 determines whether the score satisfies a threshold. For example, if the track quality score threshold is 0.75, then the score generated by machine learning model 820 for the track segment is not satisfied. If the score does not satisfy the threshold, then track segment cleaning module 630 is configured to eliminate the false track segment. For example, the track segment falsely representing the bicycle and all of the extracted features are eliminated.

Figure 9:
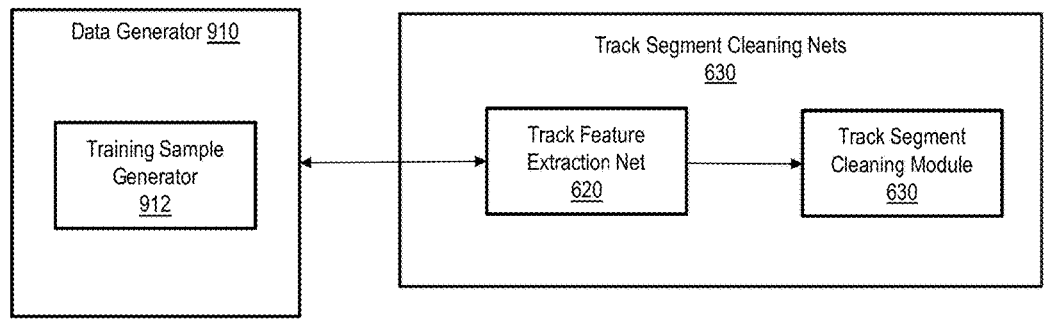
FIG. 9 is a diagram of an implementation of a training sample generator configured to generate samples for training the machine learning model.

Referring now to FIG. 9, illustrated is a diagram of an implementation of a training sample generator configured to generate samples for training the machine learning model. A training dataflow 900 utilizes a data generator 910 to generate the training samples for training the machine learning model. The training samples can be generated by training sample generator 912. Training machine learning models involved in track feature extraction net 620 and track segment cleaning modules 630 improves the accuracy of the track segment cleaning. Additionally, a training sample generator 912 corrects the problem of the shortage of labeled training samples for training the machine learning model 820.

Training sample generator 912 produces labeled training samples for training track feature extraction net 620 and machine learning model 820 of track segment cleaning module 630. Training sample generator 912 is configured to associate a label with a track segment to generate a training sample. Training sample generator 912 can utilize ground truth tracks to generate the labels for the training samples. Ground truth tracks can include accurate representations of the movement of perceived objects. Ground truth tracks can also be at least partially synthetic and correspond to the movement of simulated objects. Training sample generator 912 compares the ground truth tracks to one or more track segments to produce training samples. If training sample generator 912 makes a match between a ground truth track from a plurality of ground truth tracks and the one or more track segments, training sample generator 912 assigns a first label to the track segment to produce a training sample with a first label. Additionally, if training sample generator 912 fails to make a match between a ground truth track from a plurality of ground truth tracks and the one or more track segments, training sample generator 912 assigns a second label to the track segment to produce a training sample with a second label.

Training sample generator 912 produces training samples indicating false track segments. For example, a training sample with a quality score label of '0' indicates the training sample does not correspond to a ground truth track (i.e., the training sample is a false positive). In another example, a training sample with a quality score label of '1' indicates the training sample corresponds to a ground truth track (i.e., the training sample matches a real object). The training samples can be a standard for comparison in determining the accuracy and quality of other track segments that are input into track feature extraction net 620 and machine learning model 820 of track segment cleaning module 630.

In addition to a label indicating whether a track segment is a false track, the training samples produced by training sample generator 912 can also include a label to any two input track segments to indicate whether they should be stitched together. For example, two track segments that match with the same ground truth track are be assigned a stitching score '1' to indicate they should be combined. Two track segments that matched with different ground truth tracks will be assigned with a stitching score '0' to indicate they should not be combined. One track segment with matched ground truth track and another unmatched track segment will be assigned with stitching score of '0' since they are from different tracks. For two track segments that have no matched ground truth tracks, the stitching score between them could be ignored during training, as they will be eliminated by the tracking quality scores as their tracking quality will be 0. It is not necessary to stitch these unmatched track segments.

Training samples can be like the other track segments and include the trajectory features, cloud point features of other track segments, and/or image features. The training samples are used to train track feature extraction net 620 and machine learning model 820 together to, for example, correctly identify false track segments and track segments that are to be combined. In an embodiment, training samples may also be used as validation samples to determine whether the performance of track feature extraction net 620 and machine learning model 820 of track segment cleaning module 630 in identifying false track segments and track segments that require stitching is satisfactory.

In an embodiment, training sample generator 912 generates training samples for track feature extraction net 620 and machine learning model 820 of track segment cleaning module 630. In an embodiment, a training sample generated by training sample generator 912 includes at least two track segments. Training sample generator 912 compares a set of ground truth tracks to one or more track segments to produce the training samples with a quality score label. Training sample generator 912 compares a track segment to each of the ground truth tracks to determine whether a matching ground truth track exists for assigning a track quality label. To determine the matching ground truth track, training sample generator 912 walks through a ground truth track matching flowchart 1000 to match the correct ground truth track to the track segment and/or training sample for the quality score label. For example, if training sample generator 912 identifies a track segment matching a ground truth track, then training sample generator 912 assigns a quality score label of '1' to the training sample including the track segment based on the track segment matching the ground truth track.

Additionally, the training sample generator 912 compares two or more track segments to produce the training samples with a stitching score. A training sample generated by training sample generator 912 includes at least two track segments. Training sample generator 912 can compare the track segments of the training samples for assigning a stitching score label. To determine two or more matching track segments of a training sample, training sample generator 912 checks whether two track segments are matched to the same ground truth track. For example, if training sample generator 912 identifies a track segment can be combined with another track segment, then training sample generator 912 assigns a stitching score label of '1' to both track segments of the training sample' based on the two track segments matching the same ground truth track. If training sample generator 912 does not match a track segment to another track segment, then training sample generator 912 assigns a stitching score label of '0' to both the track segments of the training sample based on the two or more track segments not matching the same ground truth track. A track quality label of 0 can indicate that the track segment is a false track.

In an embodiment, training sample generator 912 is configured to divide a single track into two or more track segments to create training samples. Training sample generator 912 is configured to add a label to the two or more track segments to create the two or more training samples. For example, a label for the training samples including the two or more track segments has a ground truth stitching score of '1' to indicate that the two or more track segments are from the same track. Alternatively, the training samples are associated with a label identifying the two or more track segments as belonging to separate tracks. For example, a label for the training samples including the two or more track segments belonging to separate tracks has a ground truth stitching score of '0' to indicate that the two or more track segments are from different tracks. In an implementation, training sample generator 912 can randomly divide a track segment with matched ground truth labels into at least two training samples.

Dividing a track segment to create two or more training samples creates a diversity of the training data. Without a sufficient number of labeled training samples, track feature extraction net 620 and machine learning model 820 cannot accurately determine the quality score of the track segments representative of the objects encountered by the vehicle. In an embodiment, a track segment is not eligible to be divided to produce training samples if the track segment fails to satisfy a frame threshold. For example, training sample generator 912 ignores attempts to divide a track segment if the track segment has fewer than five frames. A frame can be a timestamp. In an embodiment, track sample generator 912 has a rule in which each of the at least two divided track segments has at least three timeframes.

Figure 10:
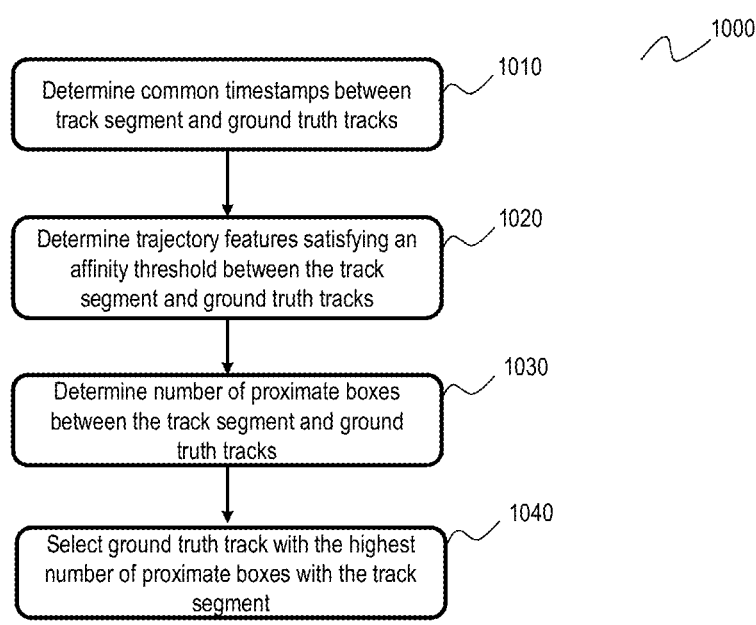
FIG. 10 is a flowchart for matching a track segment with ground truth tracks for generating a training sample.

Now referring to FIG. 10, illustrated is a flowchart for generating a training sample with a ground truth label for training a machine learning model. Ground truth track matching flowchart 1000 results in selecting a ground truth track that matches a track segment input to output a training sample. Training sample generator 912 can compare the track segment representations against the ground truth track representations to produce a labeled training sample. In an embodiment, ground truth track matching flowchart 1000 eliminates ineligible ground truth tracks to determine the ground truth track corresponding to the input track segment.

At 1010, training sample generator 912 compares the timestamps of the track segment and the ground truth track. If there are no common timestamps between the track segment and the ground truth track from the plurality of ground truth tracks, training sample generator 912 determines the ground truth track from the plurality of ground truth tracks is an ineligible match and proceeds to the next ground truth track. Training sample generator 912 compares the timestamps for each ground truth track in the plurality of ground truth tracks and determines a subset of ground truth tracks that are potentially eligible matches based on the timestamps. Ground truth tracks outside of the subset of ground truth tracks are eliminated for being ineligible matches. In an embodiment, no ground truth tracks may remain in the subset of ground truth tracks. In this case, training sample generator 912 assigns a quality score label of '0' to the track segment as none of the ground truth tracks are eligible matches.

At 1020, training sample generator 912 determines whether the ground truth track from the subset of ground truth tracks has a trajectory feature exceeding a distance threshold from the trajectory feature of the track segment. The distance threshold can be a Euclidean distance. The distance threshold can be an affinity threshold representative of any affinity or dis-similarity function. If the trajectory feature of the ground truth track from the subset of ground truth tracks exceeds the distance threshold, then training sample generator 912 determines that the ground truth track from the subset of ground truth tracks is an ineligible match and proceeds to the next ground truth track. Training sample generator 912 compares the distances of the trajectory features for each ground truth track in the plurality of ground truth tracks and determines a second subset of ground truth tracks that are potentially eligible matches based on the trajectory features. Ground truth tracks outside of the second subset of ground truth tracks are eliminated for being ineligible matches. In an embodiment, no ground truth tracks may remain in the second subset of ground truth tracks. In this case, training sample generator 912 assigns a quality score label of '0' to the track segment as none of the ground truth tracks are eligible matches.

At 1030, training sample generator 912 determines the number of boxes from the trajectory feature of the ground truth track segment from the second subset of ground truth tracks that are proximate to the boxes of the track segment. A ground truth box is proximate to a track segment box if the ground center distance or the intersection of union (IoU between the two boxes is below a certain threshold. A ground truth box is proximate to a track segment if the ground center distance of the two boxes is less than scale_factor*(diagonal(box1)+diagonal(box2))/2.0. Scale_factor of 1.5 can be used. Comparing the boxes of the ground truth track and the track segment can be used to filter poor matches between the ground truth tracks from the second subset of ground truth tracks and the track segment. If the number of proximate boxes between the ground truth track and the track segment falls below a box threshold, then training sample generator 912 determines that the ground truth track from the second subset of ground truth tracks is an ineligible match and proceeds to the next ground truth track. Training sample generator 912 compares the proximate boxes for each ground truth track from the second subset of ground truth tracks and determines a third subset of ground truth tracks that are potentially eligible matches based on the number of close boxes. Ground truth tracks outside of the third subset of ground truth tracks are eliminated for being ineligible matches. In an embodiment, no ground truth tracks may remain in the third subset of ground truth tracks. In this case, training sample generator 912 assigns a quality score label of '0' to the track segment as none of the ground truth tracks are eligible matches.

At 1040, training sample generator 912 selects the ground truth track with the highest number of proximate boxes relative to the boxes of the track segment from the third subset of ground truth tracks. In an embodiment, the selected track segment has a track quality label assigned as '1' based on the track segment matching the best ground truth track. If no ground truth tracks match the track segment, then training sample generator 912 assigns a quality score of '0'. Additionally, training sample generator 912 assigns a stitching score label of '1' based on the track segment matching the same ground truth track as another track segment. Stitching score labels of '1' are assigned to two or more two track segments if the two or more track segments correspond to the same ground truth track. If no two track segments match the ground truth track, then the training sample generator 912 assigns a stitching score of '0' to the training sample.

Figure 11:
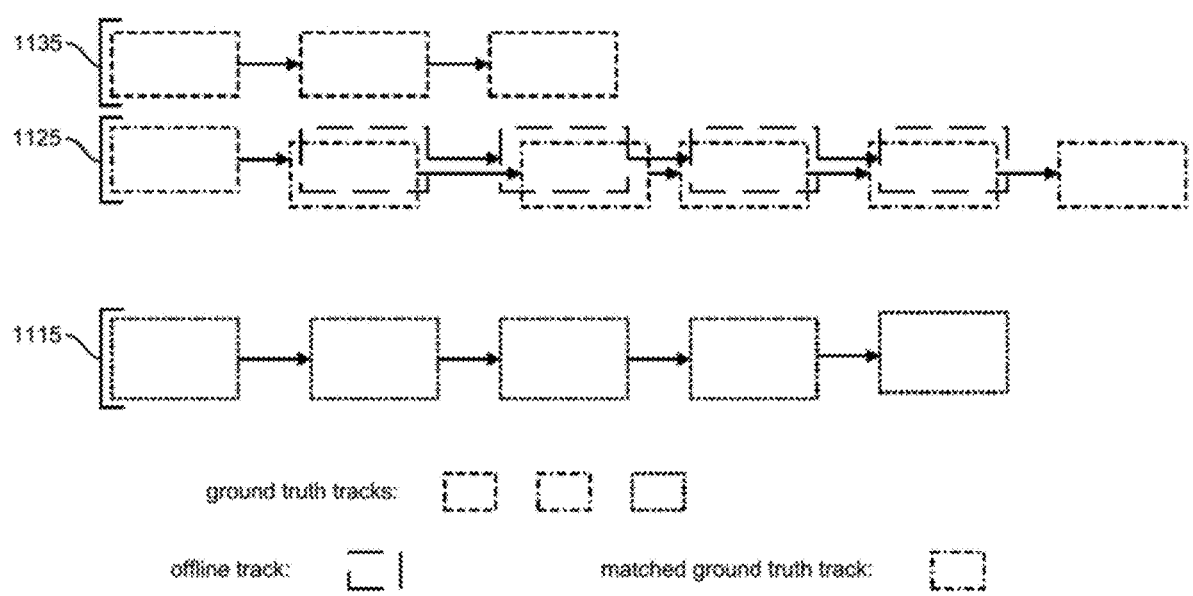
FIG. 11 is a diagram of an implementation of matching ground truth tracks to a track segment.

Now referring to FIG. 11, illustrated is a diagram of an implementation of matching ground truth tracks to a track segment. Three ground truth tracks are depicted: a first ground truth track 1115, a second ground truth track 1125, and a third ground truth track 1135. A track segment is compared against each of the three ground truth tracks to produce a labeled training sample. Performing ground truth track matching flowchart 1000 described with respect to FIG. 10, training sample generator 912 selects the ground truth track that matches with the track segment. The ground truth tracks are depicted using a trajectory of 3D boxes. The ground truth tracks are sequentially ordered based on a timestamp.

First ground truth track 1115, second ground truth track 1125, and Third ground truth track 1135 can be compared to the track segment. The comparison between the trajectory boxes of the track segment against the trajectory boxes of the ground truth tracks can be based on the steps of ground truth track matching flowchart 1000. Training sample generator 912 determines that second ground truth track 1125 is the matching ground truth track using the ground truth track matching flowchart 1000. Additionally, training sample generator 912 determines that second ground truth track 1125 is the matching ground truth track based on timestamps, trajectory features satisfying a distance threshold, and/or a number of proximate boxes between the track segment and the ground truth track. In an embodiment, the trajectory boxes for each of the ground truth tracks are aligned against the track segment to determine the best fit.

Figure 12:
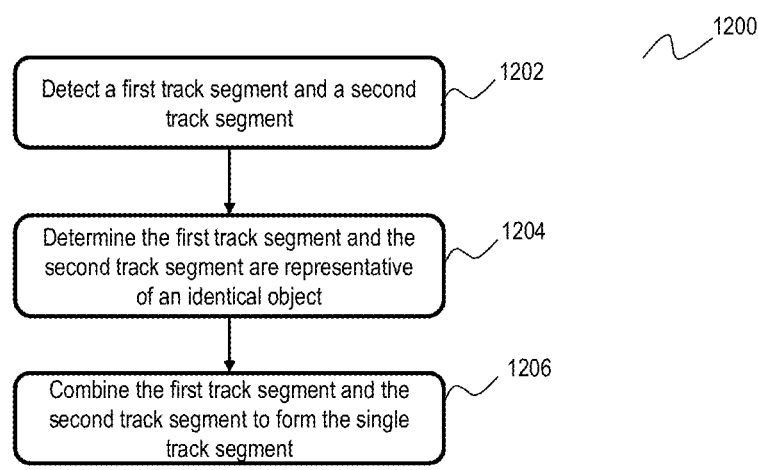
FIG. 12 is a flowchart of a process for track segment cleaning using a machine learning model.

Now referring to FIG. 12, illustrated is a flowchart of a process for track segment cleaning using a machine learning model. In some embodiments, one or more of the steps described with respect to process 1200 are performed (e.g., completely, partially, and/or the like) by the vehicle scenario mining dataflow. Additionally, or alternatively, in some embodiments, one or more steps described with respect to process 1200 are performed (e.g., completely, partially, and/or the like) by another device or group of devices separate from or including the vehicle scenario mining dataflow.

At 1202, a first track segment and a second track segment are detected. The track segments are representative of tracked objects exterior to the vehicle that are spatially monitored relative to a position of the vehicle over a period of time. For example, a bicycle detected over a first time period is the first track segment and a bicycle detected over a second time period is the second track segment.

At 1204, the first track segment and the second track segment are determined to be representative of an identical object. The first track segment and the second track segment are determined to be candidates for combination into a single track segment. Features can be extracted from the first track segment and the second track segment to be evaluated by machine learning model 820. Machine learning model 820 performs analyses and determines whether the first track segment and the second track segment satisfy score thresholds indicating that the first track segment and the second track segment are to be combined. For example, machine learning model 820 determines that the bicycle from the first track segment and the bicycle from the second track segment represent the same object.

At 1206, the first track segment and the second track segment are combined to form a single track segment. The first track segment and the second track segment are combined by concatenating the features of the first track segment with the features of the second track segment into a single set of features. For example, the features of the bicycle tracked by the first track segment are concatenated with the features of the bicycle tracked by the second track segment to form a single track segment that includes a single set of features.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   detecting, using at least one processor, a first track segment and a second track segment;
   determining, using the at least one processor, that the first track segment and the second track segment are representative of an identical object exterior to a vehicle;
   determining, using the at least one processor, a first track segment quality score associated with the first track segment and a second track segment quality score associated with the second track segment and a stitching score between the first track segment and the second track segment; and
   in response to the first track segment and the second track segment being determined to be representative of the identical object by the first track segment quality score and the second track segment quality score satisfying a quality score threshold and the stitching score satisfying a stitching score threshold, combining, using the at least one processor, the first track segment and the second track segment to form a single track segment having a single trajectory.

2. The method of claim 1, wherein the first track segment and the second track segment are combined by at least concatenating a first trajectory feature of the first track segment with a second trajectory feature of the second track segment, and wherein the first trajectory feature and the second trajectory feature include at least one of a center point, a size relative to the center point, and a heading angle.

3. The method of claim 1, wherein the first track segment and the second track segment are combined by at least concatenating a first cloud-point feature of the first track segment with a second cloud-point feature of the second track segment, and wherein the first cloud-point feature and the second cloud-point feature include at least one of a track point, a 3D characteristic feature, and a motion feature.

4. The method of claim 1, further comprising:
   determining, using the at least one processor, the first track segment satisfies a distance threshold and the second track segment satisfies the distance threshold; and
   in response to the first track segment and the second track segment satisfying the distance threshold, determining, using the at least one processor, that the first track segment and the second track segment are representative of the identical object.

5. The method of claim 1, wherein the first track segment includes a first plurality of timestamps, and wherein the second track segment includes a second plurality of timestamps.

6. The method of claim 1, further comprising:
   determining, using the at least one processor, a third track segment quality score associated with a third track segment; and
   in response to the third track segment quality score failing to satisfy the quality score threshold, eliminating, using the at least one processor, the third track segment.

7. The method of claim 1, wherein the first track segment and the second track segment are selected from a plurality of track segments, and wherein the first track segment and the second track segment are representative of tracked objects exterior to the vehicle that are spatially monitored relative to a position of the vehicle over a period of time.

8. The method of claim 1, further comprising:
   generating, using the at least one processor, at least one training sample by dividing a known single track into at least two training track segments,
   wherein the known single track includes a ground truth annotation indicating that the at least two training track segments form the known single track.

9. The method of claim 8, further comprising:
   training, using the at least one processor and based on the at least one training sample, a machine learning model to recognize the at least two training track segments form the known single track.

10. A system comprising:
    at least one processor, and
    at least one non-transitory storage media storing instructions that, when executed by the at least one processor, cause the at least one processor to perform operations comprising:
    detecting a first track segment and a second track segment;
    determining that the first track segment and the second track segment are representative of an identical object exterior to a vehicle;

determining a first track segment quality score associated with the first track segment and a second track segment quality score associated with the second track segment and a stitching score between the first track segment and the second track segment; and in response to the first track segment and the second track segment being determined to be representative of the identical object by the first track segment quality score and the second track segment quality score satisfying a quality score threshold and the stitching score satisfying a stitching score threshold, combining the first track segment and the second track segment to form a single track segment having a single trajectory and a single cloud-point feature.

11. The system of claim 10, wherein the first track segment and the second track segment are combined by at least concatenating a first trajectory feature of the first track segment with a second trajectory feature of the second track segment, and wherein the first trajectory feature and the second trajectory feature include at least one of a center point, a size relative to the center point, and a heading angle.

12. The system of claim 10, wherein the first track segment and the second track segment are combined by at least concatenating a first cloud-point feature of the first track segment with a second cloud-point feature of the second track segment, and wherein the first cloud-point feature and the second cloud-point feature include at least one of a track point, a 3D characteristic feature, and a motion feature.

13. The system of claim 10, further comprising:
determining the first track segment satisfies a distance threshold and the second track segment satisfies the distance threshold; and
in response to the first track segment and the second track segment satisfying the distance threshold, determining that the first track segment and the second track segment are representative of the identical object.

14. The system of claim 10, wherein the first track segment includes a first plurality of timestamps, and wherein the second track segment includes a second plurality of timestamps in which at least one timestamp is different from a timestamp in the first plurality of timestamps.

15. The system of claim 10, further comprising:
determining a third track segment quality score associated with a third track segment; and
in response to the third track segment quality score failing to satisfy the quality score threshold, eliminating the third track segment.

16. The system of claim 10, wherein the first track segment and the second track segment are selected from a plurality of track segments, and wherein the first track segment and the second track segment are representative of tracked objects exterior to the vehicle that are spatially monitored relative to a position of the vehicle over a period of time.

17. The system of claim 10, further comprising:
generating at least one training sample by dividing a known single track into at least two training track segments,
wherein the known single track includes a ground truth annotation indicating that the at least two training track segments form the known single track.

18. The system of claim 17, further comprising:
training, based on the at least one training sample, a machine learning model to recognize the at least two training track segments form the known single track.

19. A non-transitory computer-readable storage medium comprising at least one program for execution by one or more processors of a first device, the at least one program including instructions which, when executed by the one or more processors, cause the first device to perform operations comprising:
detecting a first track segment and a second track segment;
determining that the first track segment and the second track segment are representative of an identical object exterior to a vehicle;
determining a first track segment quality score associated with the first track segment and a second track segment quality score associated with the second track segment and a stitching score between the first track segment and the second track segment; and
in response to the first track segment and the second track segment being determined to be representative of the identical object by the first track segment quality score and the second track segment quality score satisfying a quality score threshold and the stitching score satisfying a stitching score threshold, combining the first track segment and the second track segment to form a single track segment having a single trajectory and a single cloud-point feature.

20. The non-transitory computer-readable storage medium of claim 19, wherein the first track segment and the second track segment are combined by at least concatenating a first trajectory feature of the first track segment with a second trajectory feature of the second track segment, and wherein the first trajectory feature and the second trajectory feature include at least one of a center point, a size relative to the center point, and a heading angle.

21. The non-transitory computer-readable storage medium of claim 19, wherein the first track segment and the second track segment are combined by at least concatenating a first cloud-point feature of the first track segment with a second cloud-point feature of the second track segment, and wherein the first cloud-point feature and the second cloud-point feature include at least one of a track point, a 3D characteristic feature, and a motion feature.

22. The non-transitory computer-readable storage medium of claim 19, further comprising:
determining the first track segment satisfies a distance threshold and the second track segment satisfies the distance threshold; and
in response to the first track segment and the second track segment satisfying the distance threshold, determining that the first track segment and the second track segment are representative of the identical object.

23. The non-transitory computer-readable storage medium of claim 19, wherein the first track segment includes a first plurality of timestamps, and wherein the second track segment includes a second plurality of timestamps in which at least one timestamp is different from a timestamp in the first plurality of timestamps.

24. The non-transitory computer-readable storage medium of claim 19, further comprising:
determining a third track segment quality score associated with a third track segment; and
in response to the third track segment quality score failing to satisfy the quality score threshold, eliminating the third track segment.

25. The non-transitory computer-readable storage medium of claim 19, wherein the first track segment and the second track segment are selected from a plurality of track segments, and wherein the first track segment and the second track segment are representative of tracked objects exterior to the vehicle that are spatially monitored relative to a position of the vehicle over a period of time.

26. The non-transitory computer-readable storage medium of claim 19, further comprising:
generating at least one training sample by dividing a known single track into at least two training track segments.

27. A method comprising:
detecting, using at least one processor, a first track segment and a second track segment;
determining, using the at least one processor, a first track segment quality score associated with the first track segment and a second track segment quality score associated with the second track segment;
determining, using the at least one processor, a stitching score between the first track segment and the second track segment; and
in response to the first track segment quality score and the second track segment quality score satisfying a quality score threshold and the stitching score satisfying a stitching score threshold, combining, using the at least one processor, the first track segment and the second track segment to form a single track segment representative of an identical object exterior to a vehicle.

* * * * *